United States Patent
Sauer

(10) Patent No.: US 7,564,339 B2
(45) Date of Patent: *Jul. 21, 2009

(54) SYSTEM AND METHOD FOR BROADCASTING A MESSAGE FROM A WIRELESS COMMUNICATIONS DEVICE

(75) Inventor: David Sauer, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 699 days.

This patent is subject to a terminal disclaimer.

(21) Appl. No.: 11/131,067

(22) Filed: May 16, 2005

(65) Prior Publication Data

US 2005/0212659 A1    Sep. 29, 2005

(51) Int. Cl.
*G08B 5/22* (2006.01)
(52) U.S. Cl. .................................. 340/7.46; 455/566
(58) Field of Classification Search ............... 340/7.46, 340/7.6, 7.43, 7.26, 7.2, 7.29
See application file for complete search history.

(56) References Cited

U.S. PATENT DOCUMENTS 6,009,333 A    12/1999   Chaco
6,097,964 A    8/2000    Nuovo et al.
6,282,435 B1   8/2001    Wagner et al.
6,462,646 B2   10/2002   Helferich

*Primary Examiner*—Brian A Zimmerman
*Assistant Examiner*—Nabil H Syed

(57) ABSTRACT

A message is automatically broadcast to a plurality of recipients from a mobile wireless communications device. A recipient list of recipient names and addresses is preprogrammed and stored in the wireless communications device. Recorded voice and text messages are sent to recipients and recipient telephones, voicemail systems, and email and Internet addresses from the recipient list. Delivery status options can be selected to identify the recipient addresses receiving the message, the recipient addresses with answering machines receiving the message, the recipient addresses not accepting the message, or non-communicating recipient addresses. In addition, recipient message response options can be selected including accepting, displaying or storing the responses. Recipient non-receipt options also can be selected, such as rebroadcasting the message, displaying a status message, or doing nothing in response to recipient addresses not receiving the message.

17 Claims, 3 Drawing Sheets

| | recipient memory | | 112 |
|---|---|---|---|
| GROUP | RECIPIENT | ADDRESS | |
| | c.p.mati | Telephone: 888/555-1111<br>Cell: 888/555-1101<br>Email: cpm@widget.com | |
| soccer team | l.m. jones<br>c.c. kraig<br>⋮ | Telephone: 777/555-8181<br>Telephone: 555/111-8762<br>Cell: 888/555-1101<br>⋮ | |
| vendors | jj, inc.<br>gizmos, ltd.<br>⋮ | Telephone: 777/555-8181<br>Telephone: 555/111-8762<br>⋮ | |

SYSTEM AND METHOD FOR BROADCASTING A MESSAGE FROM A WIRELESS COMMUNICATIONS DEVICE

BACKGROUND OF THE INVENTION

1. Field of the Invention

This invention generally relates to wireless communications devices and, more particularly, to a system and method for automatically broadcasting a message to a plurality of recipients from a wireless communications device.

2. Description of the Related Art

Wireless communications devices allow users to engage in one-to-one communications such as real time conversations, sending messages and pages, and accepting messages and pages. However, conventional wireless communications devices possess limited capabilities for communicating with groups of individuals. For example, a user cannot send a message to a group of individuals without dialing the number of each individual in the group, and repeating the message to each individual. Features such as redial and speed dial may accelerate the process, but do not eliminate the need to dial each number.

Within a voicemail system, it is known to record a message, select a group of individuals to receive the message, and send the message to the selected group using a minimal set of commands. However, the recipients are restricted to individuals within the voice mail system. Individuals connected to public switch telephone networks (PSTNs) or wireless networks outside the voicemail system do not receive the message.

It is known to use facsimile machines to select a group of recipient telephone numbers, and send a text message to the group using a minimal set of commands. This method, however, is restricted to text messages and recipients connected to PSTNs. It also is known to record voice messages and create contact lists in wireless communications devices.

It would be advantageous if a wireless communications device could send a recorded message to a group of recipients using a minimal set of commands that is executed only one time for each message broadcast sequence.

SUMMARY OF THE INVENTION

The present invention was created to address the problem of using a wireless communications device to automatically send a recorded message to a group of recipients. The invention addresses this problem by having a broadcast circuit in a wireless communications device accept recorded messages, recipient lists, and broadcast option selections. Then, the device automatically, for example, with a single key stroke, supplies the message to the recipients via an airlink interface.

Accordingly, in a mobile wireless communications device, a method is provided for automatically broadcasting messages to a plurality of recipients. The method comprises: preprogramming a recipient list of recipient names and addresses; storing the recipient list in the wireless communications device; recording voice and text messages; selecting recipients and recipient telephones, voicemail systems, and email and Internet addresses from the recipient list; and, selecting delivery status options. The delivery status options can be used to identify the recipient addresses receiving the message, the recipient addresses with answering machines receiving the message, the recipient addresses not accepting the message, or non-communicating recipient addresses. In addition, recipient message response options can be selected.

For example, the user can accept responses from the recipients, display the responses from the recipients, or store the responses from the recipients in the wireless communications device. Recipient non-receipt options also can be selected, such as rebroadcasting the message to recipient addresses not receiving the message, displaying a status message regarding recipient addresses not receiving the message, or doing nothing in response to recipient addresses not receiving the message.

Additional details of the above-described method, and a system for automatically broadcasting a message to a plurality of recipients from a mobile wireless communications device are presented below.

DETAILED DESCRIPTION OF THE PREFERRED EMBODIMENTS

Figures 1, 3:
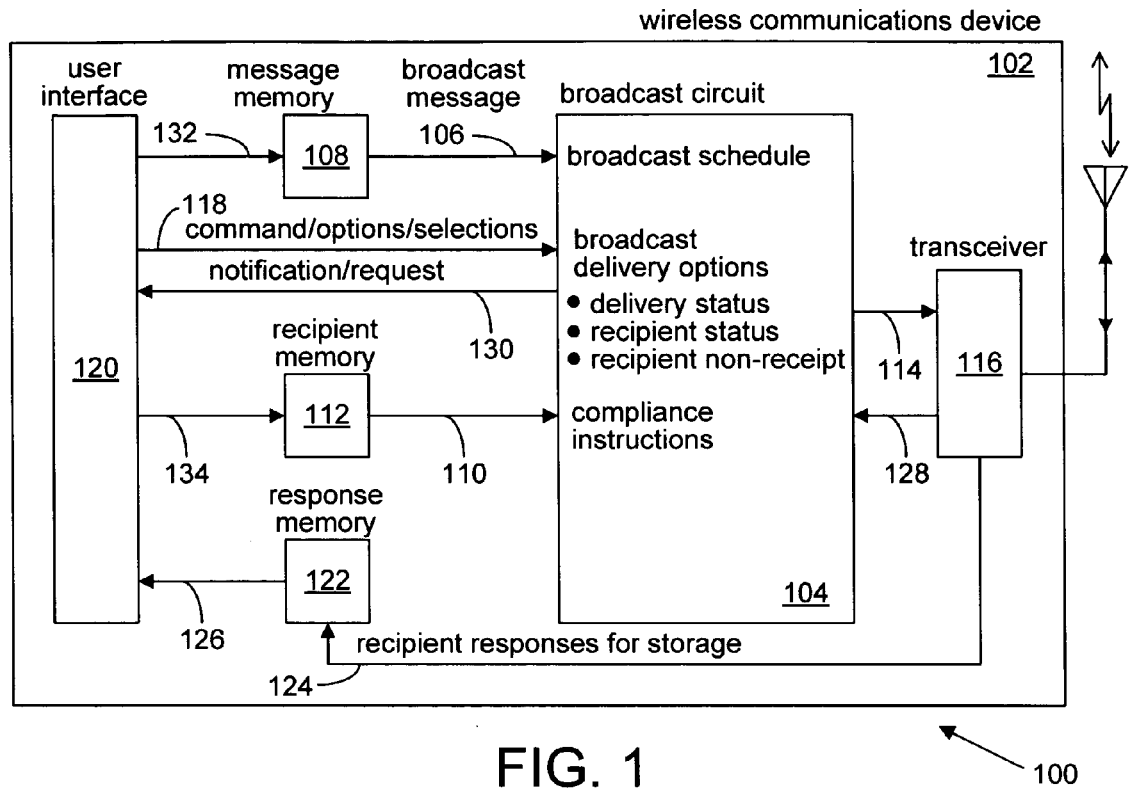
FIG. 1 is a schematic block diagram depicting the system for automatically broadcasting a message to a plurality of recipients from a mobile wireless communications device in accordance with the present invention.
FIG. 3 is a schematic block diagram showing the recipient memory of FIG. 1 in further detail.

FIG. 1 is a schematic block diagram depicting the system 100 for automatically broadcasting a message to a plurality of recipients from a mobile wireless communications device in accordance with the present invention. Wireless communications device 102 has a broadcast circuit 104 with an input on line 106 to accept a broadcast message from message memory 108, and an input on line 110 to accept selected message recipients from recipient memory 112. The broadcast circuit 104 has an output on line 114 to supply the broadcast message and the selected recipients to a transceiver 116 for transmission via an airlink interface. The airlink interface includes the antenna shown in FIG. 1, as well as modulating circuits, power amplifiers, and other components (not shown), but well known in the art.

The broadcast circuit 104 includes an input on line 118 to accept broadcast schedule selections, broadcast delivery option selections, and a broadcast command signal from a wireless communications device user interface 120, as explained below. The broadcast delivery option selections include delivery status options, recipient message response options, and recipient non-receipt options. The user interface 120 can be a key pad, display, or voice recognition software within the wireless communications device. The schedule selections provide greater flexibility by allowing programming of the broadcast message transmission.

Figure 2:
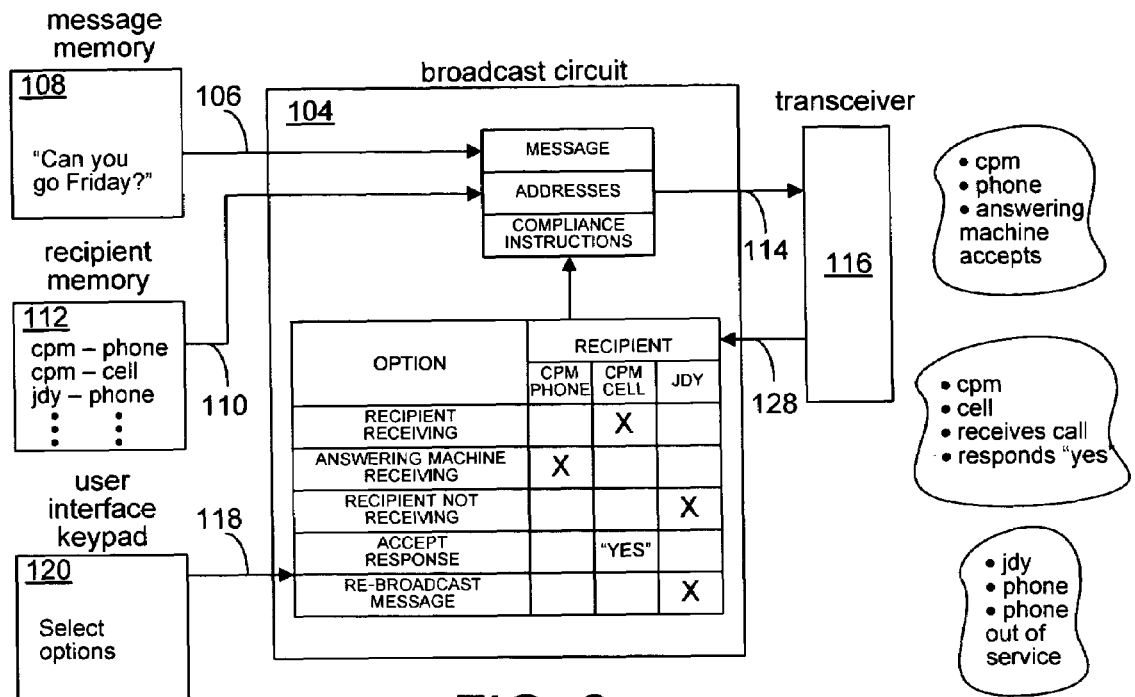
FIG. 2 is a diagram illustrating an example of the system in FIG. 1 for automatically broadcasting a message to a plurality of recipients in accordance with the present invention.

FIG. 2 is a diagram illustrating an example of the system 100 in FIG. 1 for automatically broadcasting a message to a plurality of recipients in accordance with the present invention. FIG. 2 represents one software/hardware solution for implementing the system 100. However, the system 100 is not limited to this particular implementation. The first and second delivery status options are used, respectively, to confirm recipient addresses receiving the message and recipient addresses with answering machines receiving the message. In FIG. 2, the first and second delivery status options are selected. The broadcast circuit 104 determines which recipients and recipient answering machines received the broadcast message ("cpm cell" and "cpm phone" respectively in FIG. 2) and the broadcast circuit 104 establishes a record accordingly.

The third and fourth delivery status options are used, respectively, to confirm recipient addresses not accepting the message and non-communicating recipient addresses. Non-communicating recipient addresses include those cases in which the wireless communications device is unable to connect with a selected recipient address. For example, an out-of-service recipient telephone or technical difficulties with the PSTN servicing a recipient. In FIG. 2, the fourth delivery status option is selected. The user is unable to connect to recipient "jdy phone" and this information is recorded by the broadcast circuit 104. The confirmation options permit a determination to be made of whether the message was successfully received and a determination to be made of whether any further action is required.

The recipient message response options enable more interactive communication with broadcast message recipients. These options include accepting responses from the recipients, displaying the responses, and storing the responses in the wireless communications device 102. The transceiver 116 supplies responses for storage to a response memory 122 using an output on line 124. The response memory 122 supplies responses to be displayed to the user interface 120 display using an output on line 126. In FIG. 2, the first response option is selected. Recipient "cpm cell" responds to the message, and broadcast circuit 104 records the response.

The case in which recipients do not receive the broadcast message is of particular concern and is addressed by three recipient non-receipt options. The first option instructs the broadcast circuit 104 to rebroadcast the broadcast message to recipient addresses not receiving the broadcast message. The second option instructs the broadcast circuit 104 to display a status message on the user interface 120 display via an output on line 130 regarding recipient addresses not receiving the broadcast message. The third option instructs the broadcast circuit 104 to do nothing in response to recipient addresses not receiving the broadcast message. In the event that rebroadcast of the message is selected, broadcast circuit 104 accepts instructions from user interface 120 via an input on line 118 or follows predetermined instructions. These instructions to the broadcast circuit 104 indicate how many times the rebroadcasting of the message is to be attempted, and how much time to wait between rebroadcast attempts.

Once the various broadcast delivery options are entered in the broadcast circuit 104, broadcast circuit 104 establishes compliance instructions necessary for the recipient addresses to comply with the options selected and for the broadcast circuit 104 to execute the options selected. For example, if the option of receiving a response from recipients is selected, the recipients must be informed that a reply is desired, and the wireless communications device 102 must be prepared to accept response transmissions from the recipients. After the broadcast schedule and broadcast delivery option selections are entered in the broadcast circuit 104, the broadcast command signal to initiate the broadcast is issued from user interface 120 using an input on line 130.

The broadcast circuit 104 supplies the compliance instructions along with the broadcast message and message recipients to the transceiver 116 using an output on line 114. The transceiver 116 receives recipient return information responsive to the compliance instructions via the airlink interface and has an output on line 128 to supply the recipient return information to the broadcast circuit 104.

Upon receiving the recipient return information, the broadcast circuit 104 determines if notification information should be supplied to the user interface 120. The notification information required depends on the broadcast delivery options selected and the nature of the response from the recipients, but could include the status of the message broadcast (for example, call received) or a reply to the broadcast message by the recipient. The broadcast circuit 104 also determines if it is necessary or desirable to request additional information from the user in response to the recipient return information. For example, if the specified number of rebroadcast attempts have been made and the recipient has still not been reached, the broadcast circuit 104 may send a request for further commands to user interface 120. The broadcast circuit 104 has an output on line 130 to supply any notification information and requests for additional information to the user interface 120. The broadcast circuit 104 accepts responses to the requests for additional information from the user interface 120 on the input on line 118.

The message memory 108 has an input on line 132 to accept a voice or text broadcast message from user interface 120. The recipient memory 112 has an input on line 134 connected to the user interface 120. The input on line 134 serves two purposes. The input on line 134 can be used to supply recipient names and addresses for storage in recipient memory 112. That is, the input on line 134 can be used to preprogram the entries in recipient memory 112. The recipient addresses correspond to the recipient devices to which the broadcast message is sent. These devices can include telephones, voicemail boxes, and email and Internet addresses. In FIG. 2, telephones and a cell phone are shown as recipient addresses. A recipient may have a plurality of addresses as shown in FIG. 2. The addresses available for receiving the broadcast may depend on the services available to the recipient. For example, if a voicemail box is to be used as an address, the voicemail system must be capable of accepting incoming calls directly.

Recipients stored in the recipient memory 112 also can be arranged into groups. For example, a coach of a youth sports team could arrange the appropriate names and addresses for each team member into a group. To send a message to the team members, the coach can select the group as the recipient, rather than each team member one-by-one. The broadcast circuit 104 then supplies instructions to send the message to each recipient in the group, reducing the effort needed by the coach to supply information to the recipients. The input on line 134 also is used to select the recipients, recipient groups, and recipient addresses to receive the broadcast. As shown in FIG. 2, the broadcast message may be sent to multiple addresses for a single recipient.

FIG. 3 is a schematic block diagram showing the recipient memory of FIG. 1 in further detail. In FIG. 3, an individual recipient listing is shown and two group listings are shown. The selection of groups, group titles, and group entries can be selected to suit the user. For example, the group "soccer team" shown in FIG. 3 could be the youth sports group noted in the previous paragraph.

In one aspect of the system 100, the message memory 108 includes a plurality of broadcast message macros with blank fields. The input on line 132 is used to load the messages into message memory 108, to select which macro message to broadcast, and to supply the information needed to fill the blank fields in the macro. For example, a message macro may consist of a message announcing that the message sender will be out of their office with the blank fields providing time and date to identify when the time period in question begins and ends.

In one aspect of the invention, the message memory 108 includes a plurality of predetermined broadcast messages in storage. The input on line 132 is used to store the messages in message memory 108 and to select which messages stored in message memory 108 to use. This option provides the convenience of selecting rather than recording messages, and is useful for commonplace or reoccurring situations. Returning to the example of the youth sports team coach, if practices are routinely cancelled due to inclement weather, the coach could preprogram a message to that effect to save the effort of recording the message every time practices are cancelled and a message must be sent to the team members. In one aspect of the invention, the message memory 108 accepts data and video message downloads from the user interface 120 on the input on line 132. The data and video downloads could be stand-alone messages, or could supplement other messages subsequently broadcast.

Figure 4:
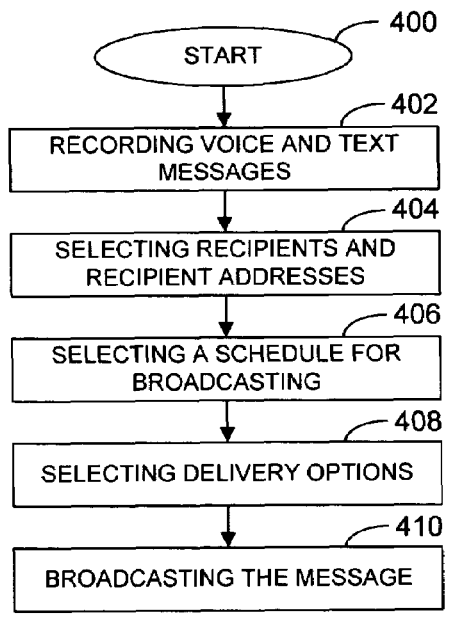
FIG. 4 is a flow chart illustrating the method for automatically broadcasting a message to a plurality of recipients from a mobile wireless communications device in accordance with the present invention.

FIG. 4 is a flow chart illustrating the method for automatically broadcasting a message to a plurality of recipients from a mobile wireless communications device in accordance with the present invention. Although the method in FIG. 4 (and FIGS. 5 and 6 below) is depicted as a sequence of numbered steps for clarity, no order should be inferred from the numbering unless explicitly stated. The method starts at Step 400. Step 402 records voice and text messages. Step 404 selects recipients and recipient addresses from a preprogrammed recipient list. Step 406 selects a schedule for broadcasting the message. Step 408 selects delivery options associated with broadcasting the message. Step 410 broadcasts the message in response to a single command to the wireless communications device.

In one aspect of the method, selecting recipients and recipient addresses from a preprogrammed recipient list in Step 404 includes selecting recipient addresses from the group including recipient telephones, voicemail boxes, and email and Internet addresses. In another aspect of the method, selecting recipients and recipient addresses from a preprogrammed recipient list in Step 404 includes preprogramming the recipient list, the list including entries selected from the group including recipient names, and addresses, and storing the recipient list.

In one aspect of the method, recording voice and text messages in Step 402 includes establishing a plurality of message macros with blank fields, selecting a macro, and completing the blank fields in the macro. In another aspect of the method, recording voice and text messages in Step 402 includes establishing a plurality of predetermined messages and selecting a message from the plurality of predetermined messages. In one aspect, recording voice and text messages in Step 402 includes downloading data and video messages into the wireless communications device from an interface port.

Figure 5:
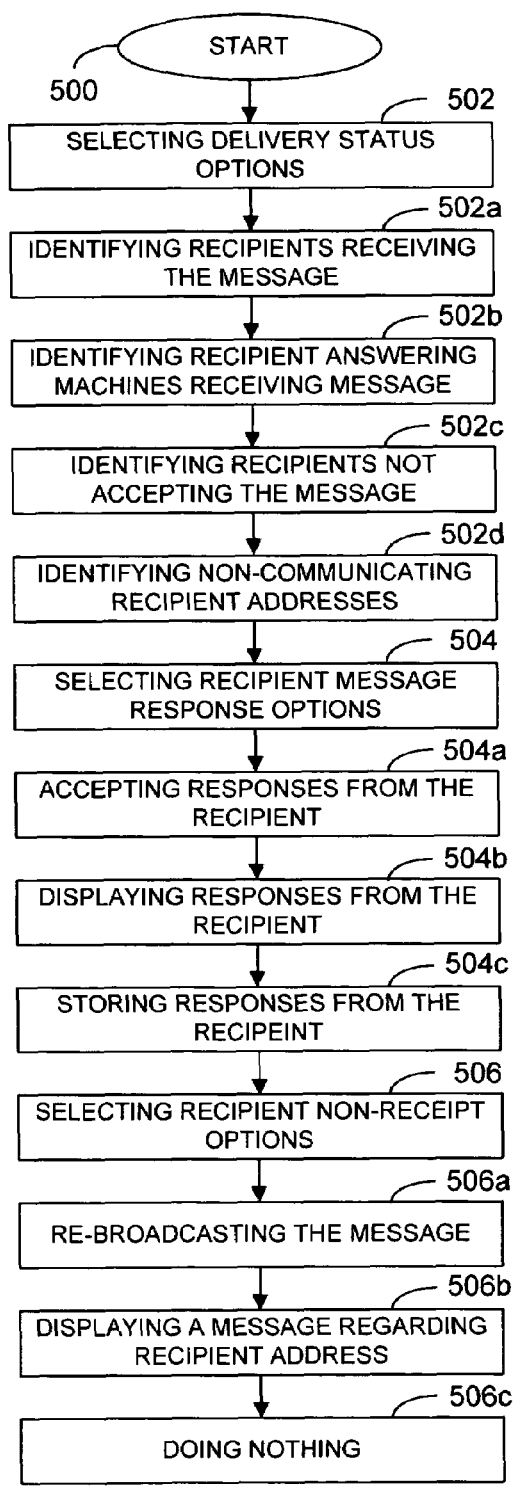
FIG. 5 is a flowchart showing in further detail the selection of delivery options (Step 408) illustrated in FIG. 4.

FIG. 5 is a flowchart showing in further detail the selection of delivery options (Step 408) illustrated in FIG. 4. The method starts at Step 500. Step 502 selects delivery status options. Step 502a identifies recipient addresses receiving the message. Step 502b identifies recipient addresses with answering machines receiving the message. Step 502c identifies recipient addresses not accepting the message. Step 502d identifies non-communicating recipient addresses.

Step 504 selects recipient message response options. Step 504a accepts responses from the recipients. Step 504b displays the responses. Step 504c stores the responses in the wireless communications device. Step 506 selects recipient non-receipt options. Step 506a rebroadcasts the message to recipient addresses not receiving the message. Step 506b displays a status message regarding recipient addresses not receiving the message. Step 506c does nothing in response to recipient addresses not receiving the message. In one aspect of the method, rebroadcasting the message to recipient addresses not receiving the message in Step 506a includes selecting the number of rebroadcast attempts and the time between rebroadcast attempts.

Figure 6:
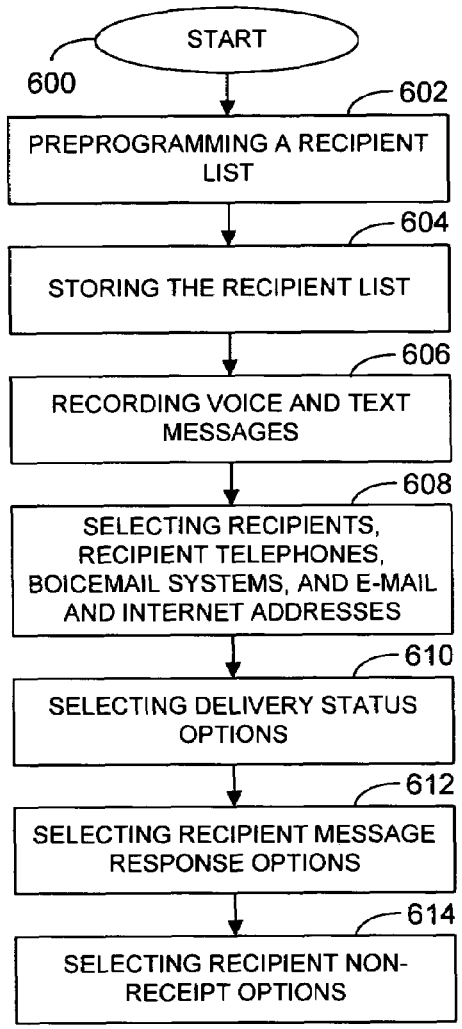
FIG. 6 is a flowchart illustrating another aspect of the method for automatically broadcasting a message to a plurality of recipients from a mobile wireless communications device in accordance with the present invention.

FIG. 6 is a flowchart illustrating another aspect of the method for automatically broadcasting a message to a plurality of recipients from a mobile wireless communications device in accordance with the present invention. The method starts at Step 600. Step 602 preprograms a recipient list of recipient names and addresses. Step 604 stores the recipient list in the wireless communications device. Step 606 records voice and text messages. Step 608 selects recipients, recipient telephones, voicemail systems, and email and Internet addresses from the recipient list. Step 610 selects delivery status options from the group including identifying: recipient addresses receiving the message, recipient addresses with answering machines receiving the message, recipient addresses not accepting the message, and non-communicating recipient addresses. Step 612 selects recipient message response options from the group including: accepting responses from the recipients, displaying the responses from the recipients, and storing the responses from the recipients in the wireless communications device. Step 614 selects recipient non-receipt options from the group including: rebroadcasting the message to recipient addresses not receiving the message, displaying a status message regarding recipient addresses not receiving the message, and doing nothing in response to recipient addresses not receiving the message.

A system and method are provided for automatically broadcasting messages to a plurality of recipients using a wireless communications device. A few examples have been provided of the kinds of delivery and responses possible. However, the present invention is not limited to just these particular examples. Other variations and embodiments of the invention will occur to those skilled in the art.

I claim:

1. A wireless communications device for broadcasting a message to a plurality of recipients, comprising:

a message memory for storing the message;

a recipient memory for storing at least one recipient address of a plurality of recipient addresses, the at least one recipient address corresponding to at least one recipient of the plurality of recipients;

a user interface for selecting the at least one recipient, for selecting delivery status option selections, recipient message response option selections, and recipient non-receipt option selections from a user, the user interface for reporting a delivery status for the message as specified by the selected delivery status option selections, the delivery status option selections comprising:

a first delivery option for reporting that the at least one recipient received the message;

a second delivery option for reporting that an answering machine of the at least one recipient received the message; and a third delivery option for reporting that the at least one recipient did not receive the message;

a broadcast circuit connected to the message memory, the recipient memory and the user interface, the broadcast circuit for controlling a broadcast of the message in accordance with the delivery status option selections, the recipient message response option selections, and the recipient non-receipt option selections; and, a transceiver connected to the broadcast circuit for transmitting the message over an airlink interface to the at least one recipient.

2. The wireless communications device of claim 1 wherein the user interface is connected to the message memory for storing one of a voice message, a text message and video message into the message memory.

3. The wireless communications device of claim 1 wherein the broadcast circuit establishes compliance instructions for the at least one recipient address in response to the delivery status option selections.

4. The wireless communications device of claim 3 wherein the broadcast circuit supplies the compliance instructions with the message for transmission to the at least one recipient.

5. The wireless communications device of claim 4 wherein the transceiver receives recipient return information over the airlink interface responsive to the compliance instructions, and wherein the transceiver supplies the recipient return information to the broadcast circuit.

6. The wireless communications device of claim 5 wherein the broadcast circuit utilizes the recipient return information to display a delivery status on the user interface in accordance with the delivery status option selections.

7. The wireless communications device of claim 1 wherein the recipient message response option selections comprise:
accepting a response from the at least one recipient,
displaying the response, and
storing the response in the response memory.

8. The wireless communications device of claim 7 further comprising:
a response memory connected to the broadcast circuit for accepting and storing the response, the response memory further connected to the user interface for displaying the stored response on the user interface.

9. The wireless communications device of claim 1 wherein the recipient non-receipt option selections comprise:
rebroadcasting the message to the recipient addresses not receiving the message,
displaying a status message regarding the recipient addresses not receiving the message, and
doing nothing in response to the recipient addresses not receiving the message.

10. The wireless communications device of claim 9 wherein the broadcast circuit accepts rebroadcast selections from the user interface comprising:
a number of rebroadcast attempts; and
a time between rebroadcast attempts.

11. The wireless communications device of claim 10 wherein the message memory comprises:
a plurality of message macros with blank fields;
wherein the user interface is utilized for selecting a message macro of the plurality of message macros, and for populating the blank fields of the selected message macro.

12. A wireless communications device for automatically broadcasting messages to a plurality of recipients, comprising:
a message memory area for storing a plurality of messages;
a recipient memory area for storing a plurality of recipient addresses corresponding to the plurality of recipients;
a user interface for selecting a message of the plurality of messages from the message memory area, for selecting at least one recipient address of the plurality of recipient addresses from the recipient memory area, and for selecting delivery status option selections, the user interface for reporting a delivery status for the message as specified by the selected delivery status option selections, the delivery status option selections comprising:
a first option for reporting that the at least one recipient received the message;
a second option for reporting that an answering mechanism of the at least one recipient received the message; and
a third option for reporting that the at least one recipient did not receive the message;
a broadcast circuit connected to the message memory area to accept the selected message, connected to the recipient memory area to accept the selected at least one recipient address, and connected to the user interface to accept the selected delivery status option selections, the broadcast circuit creating a broadcast message comprising the selected message and compliance instructions based upon the selected delivery status option selections; and,
a transceiver connected to the broadcast circuit for transmitting the broadcast message to the selected at least one recipient address over a wireless interface.

13. A system for broadcasting a message to a plurality of recipients using a wireless communications device, the system comprising:
a user interface for creating the message;
a first selection means for selection at least one recipient of the plurality of recipients from a recipient list;
a second selection means for selecting at least one recipient address of a plurality of recipient addresses from the recipient list, the at least one recipient address corresponding to the at least one recipient;
a third selection means for selecting at least one delivery status option of a plurality of delivery status options for the at least one recipient, the plurality of delivery status options comprising:
reporting that the at least one recipient received the message;
reporting that an answering machine of the at least one recipient received the message; and
reporting that the at least one recipient did not receive the message;
a broadcasting means for broadcasting the message to the selected at least one recipient over a wireless communications network; and
a broadcast circuit means for receiving and recording a delivery status for the broadcast message as specified by the selected at least one delivery status option.

14. The system of claim 13 further comprising a fourth selection means for selecting a schedule for broadcasting the message, and wherein the broadcasting means broadcasts the message at the selected schedule.

15. The system of claim 13 wherein the plurality of recipient addresses comprises:
recipient telephone numbers;
recipient voicemail boxes;
recipient e-mail addresses; and
recipient Internet addresses.

16. The system of claim 13 wherein the recipient message response options comprise:
accepting a response from the at least one recipient;
displaying the response; and
storing the response in a response memory.

17. The system of claim 13 wherein the recipient non-receipt options comprise:
rebroadcasting the message to the recipient addresses not receiving the message,
displaying a status message regarding the recipient addresses not receiving the message, and
doing nothing in response to the recipient addresses not receiving the message.

* * * * *